Dec. 20, 1960  J. F. BURNS, JR  2,965,186
OUTBOARD MOTOR DRIVEN VEHICLE
Filed May 4, 1959  2 Sheets-Sheet 1
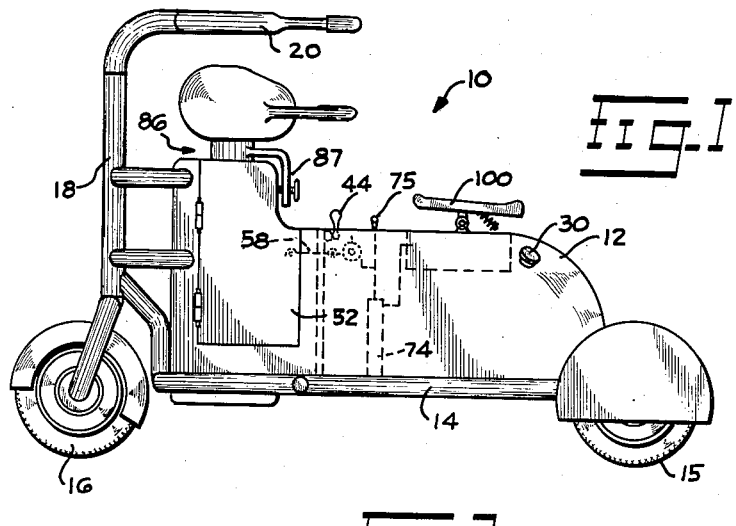
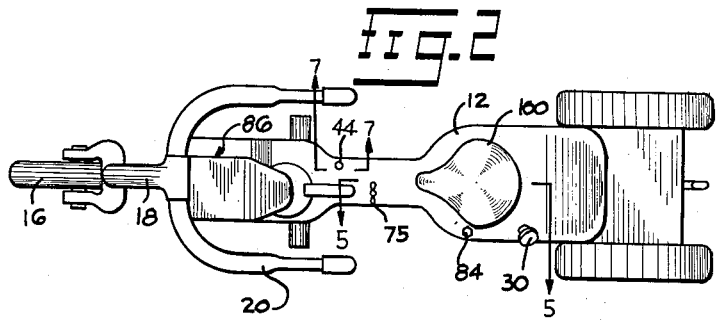
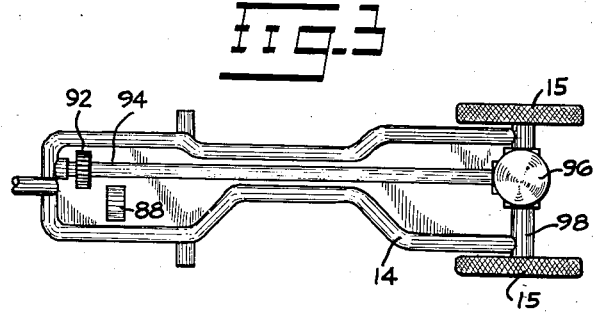
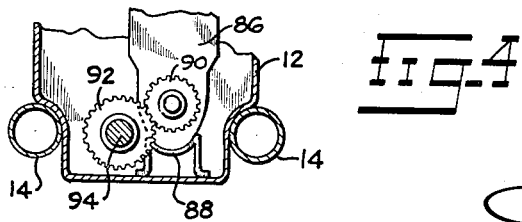
INVENTOR.
JAMES F. BURNS Jr.
BY Carl Miller
ATTORNEY

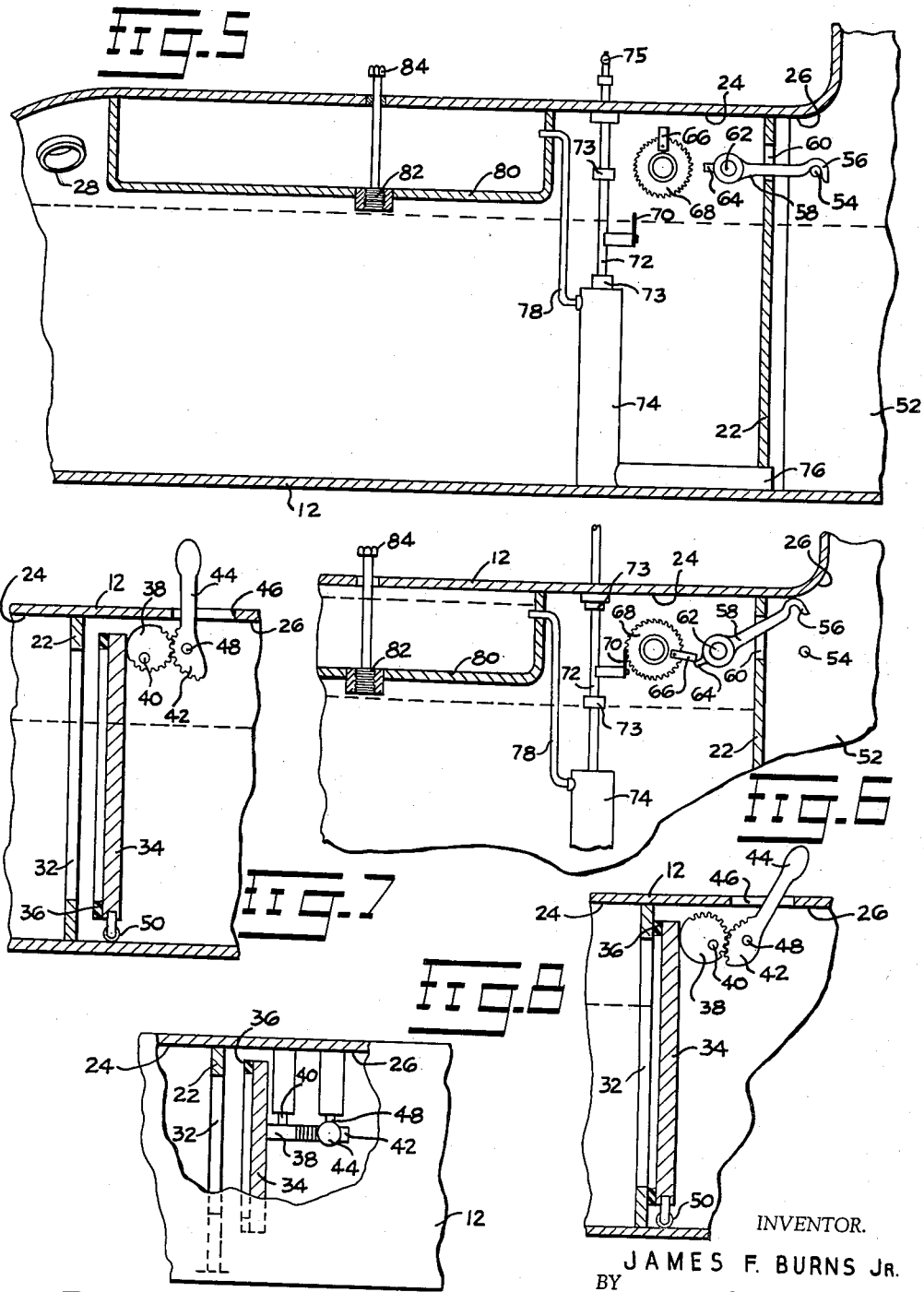

2,965,186
OUTBOARD MOTOR DRIVEN VEHICLE

James F. Burns, Jr., Glen Head, N.Y.
(151 Prospect Ave., Westwood, N.J.)

Filed May 4, 1959, Ser. No. 810,606

6 Claims. (Cl. 180—64)

This invention relates to vehicles and, more particularly, to an outboard motor driven vehicle.

Ordinarily, outboard motors are relatively expensive items when compared to the limited usefulness thereof. It is therefore an object of the present invention to provide a land vehicle that can be effectively driven by an outboard motor to increase the usefulness and thus reduce the relative cost thereof.

Another object of the present invention is to provide an outboard motor driven vehicle having self contained liquid coolant distributing means for enabling such outboard motors to be effectively used without damage thereto.

Another object of the present invention is to provide a vehicle of the type described that has a mount for an outboard motor that will enable such motor to be readily assembled and disassembled, thus enabling the outboard motor to be conveniently mounted or removed depending upon the particular use desired of the motor.

An additional object of the present invention is to provide an outboard motor driven vehicle that is extremely simple in construction, efficient in use, and which can be manufactured at a relatively low cost.

All of the foregoing and still further objects and advantages of this invention will become apparent from a study of the following specification, taken in connection with the accompanying drawing, wherein:

Figure 1 is a side elevational view of a vehicle made in accordance with the present invention in actual use;

Figure 2 is a top plan view of the device shown in Figure 1;

Figure 3 is a fragmentary cross sectional view showing the interior of certain parts of the assembly shown in Figure 1;

Figure 4 is an enlarged fragmentary cross sectional view of certain parts of the drive mechanism shown in Figure 3;

Figure 5 is an enlarged fragmentary longitudinal cross sectional view taken along line 5—5 of Figure 2, with the parts in a normal operating position;

Figure 6 is a view similar to Figure 5, showing certain of the parts in an adjusted position;

Figure 7 is an enlarged fragmentary cross sectional view taken along line 7—7 of Figure 2 showing other parts in a normal operating position;

Figure 8 is a view similar to Figure 7, showing the parts in an adjusted position; and Figure 9 is a plan view, with parts broken away, of the section of the view shown in Figure 7.

Referring now to the drawing, and more particularly to Figures 1 and 2 thereof, a vehicle 10 made in accordance with the present invention is shown to include a main body 12 that is supported upon a frame 14 having a set of driving wheels 15 and a steering wheel 16 carried upon a fork 18 having a pair of outwardly extending handle bars 20.

As is more clearly shown in Figures 5 to 9 of the drawing, the interior of the main body 12 has a partition 22 that divides it into separate rear and forward compartment 24, 26. The rear compartment 24 includes an inlet port 28 that is normally closed by a cap 30, but which may be used to fill the interior of the rear compartment 24 with a suitable outboard motor coolant, such as permanent anti-freeze. The partition wall 22 includes an enlarged central aperture 32, through which such coolant may flow into the forward compartment 26 for serving the outboard motor assembly 86 during use. However, a hatch panel 34 rollably carried upon a set of rollers 50, may be selectively moved into closing engaging engagement with the aperture 32 by means of an eccentric cam wheel 38 supported upon a shaft 40 having peripheral teeth in meshing engagement with corresponding teeth of a sector gear 42 at one end of a control handle 44. This handle 44 extends upwardly through a slot 46 in the front compartment body wall and is pivotally carried by such main body by means of a horizontal pivot shaft 48. In response to movement of the handle 44 from the position shown in Figure 7 to the position shown in Figure 8, an eccentric wheel 38 will move the hatch panel 34 toward closing engagement with the opening 32 in the partition wall 22, a gasket 36 providing an effective seal therebetween.

The coolant may then be removed from the forward compartment 26, when the hatch panel 34 is closed, by operating a hand pump 74 which has an inlet 76 in communication with the forward compartment 26. The handle 75 of the pump actuates the piston rod 72 thereof so as to cause the coolant to be drawn inwardly through the inlet 76, through a connecting line 78, and into a reservoir 80 that is disposed within the rear compartment 24. Limit stops 73 determine the opposite extremities of movement of the rod 72, while a pawl carried by the piston rod 72 engages a ratchet wheel 68 that is rotatably carried upon the main body 12 during each stroke of the handle 75. Each engagement of the pawl with the ratchet wheel will effect rotation of the ratchet wheel one increment, thus rotating the ratchet wheel 68 in increments to move a detent 66 carried thereby toward abutting relationship with a lug 64 on one end of a latch bar 58. This latch bar is carried upon a pivot pin 62 and has a hook member 56 at its opposite end which extends through an upper opening 60 in the partition wall 22, into normally locking engagement with a latch pin 54 on a side door 52 of the main body. As a result, after actuating the pump 74 a predetermined number of times, the pawl 70 will have effectively rotated the ratchet wheel 78 a sufficient amount to unlock the latch hook 56 from the latch pin 54. The predetermined number of pump strokes is sufficient to cause all of the coolant carried within the forward compartment 26 to be emptied into the reservoir 80, thus preventing any coolant from being spilled when the side door 52 is opened to either install or remove the outboard motor 86.

The outboard motor assembly 86 has a suitable clamp 87 for maintaining it in proper assembly with the main body 12 of the vehicles, while a bracket 88 carried adjacent to the bottom of the forward compartment 26 receives and supports the lower end of the outboard motor casing. A pinion 90 is substituted for the drive screw of the motor, which pinion is placed into meshing engagement with a drive pinion 92 mounted upon the drive shaft 94 of the vehicle. This drive shaft is drivingly connected to differential gearing 96 that is mounted upon the rear axle 98. Thus, a driver seated upon the seat 100 and steering the vehicle by means of the handle bars 20, may be carried by the direct drive connection between the door 86 and the differential gearing 96.

In actual use, the coolant is retained within the rear compartment 24 or within the reservoir 80 until a motor 86 is mounted properly within the front compartment 26 of the main body. After the motor has been properly positioned, the door 52 is closed and the handle 75 is actuated several times to allow the detent 66 to pass the lug 64 of the latch hook 58, thus allowing the hook portion 56 thereof to drop into locking engagement with the latch pin 54. This prevents the door 52 from being opened until later released. The handle 44 is then moved from the locking position shown in Figure 8 to the release position shown in Figure 7, at which time the coolant from the interior of the rear compartment 24 will be permitted to flow into the forward compartment 26, into cooling relationship with the motor, which will circulate such coolant when in use. The handle 84 may also be rotated to disengage the stop plug 82 of the reservoir 80, thus allowing all coolant carried within the reservoir 80 to return into circulation with the other coolant of the system. Thus, a large quantity of coolant is available for use by the motor, to take the place of the water ordinarily used by such outboard motors during their intended use. Whenever it is desired to remove the outboard motor 86 for any reason at all, the handle 44 is moved from the open position shown in Figure 7 to the closed position shown in Figure 8, and the pump handle 75 is actuated the predetermined number of times to drain the forward compartment 46 of coolant and to automatically open the front door 52, all as hereinbefore described.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An outboard motor driven vehicle comprising, in combination, a main frame having ground engaging drive and guide wheels, a housing carried upon said main frame, said housing having an outboard motor mounting, liquid coolant storage means for cooling a motor carried upon said motor mounting, and flow control means for controlling flow of the supply of liquid coolant from said liquid coolant storage means to the vicinity of said motor mounting, said housing including an interior partition dividing the interior thereof into a separate forward compartment and a rearward compartment, said motor mounting being disposed adjacent to said forward compartment, and said flow control means is disposed within said rear compartment.

2. An outboard motor driven vehicle as set forth in claim 1, further comprising a drive assembly connected between said motor mount and said drive wheels.

3. An outboard motor driven vehicle as set forth in claim 2, wherein said flow control means comprises an aperture in said partition wall normally providing communication between said front and rear compartments, a hatch plate selectively movable into closing engagement with said aperture, and a manually operated pump for draining coolant from said front compartment with said hatch plate in a closed position.

4. An outboard motor driven vehicle as set forth in claim 3, wherein said pump includes an inlet communicating with the interior of said front compartment, and a reservoir carried within said rear compartment, said pump selectively removing coolant from said front compartment to said reservoir in response to actuation of said pump.

5. An outboard motor driven vehicle as set forth in claim 4, wherein said motor mount includes a side opening access door, latch means normally maintaining said door in a locked position, and detent means acting between said pump and said latch means selectively unlocking said side opening door in response to actuation of said pump.

6. An outboard motor driven vehicle as set forth in claim 5, further comprising manually operated drain means for returning coolant from said reservoir into the interior of said rear compartment with said hatch plate in an open position relative to said aperture in said partition wall.

References Cited in the file of this patent

FOREIGN PATENTS 1,097,434    France _____ Feb. 16, 1955